United States Patent [19]

Distler

[11] 4,442,158

[45] Apr. 10, 1984

[54] FOOD PACKAGE OF PLASTIC LAMINATE

[76] Inventor: James A. Distler, Cloudsley Co. - 470 W. Northland Rd., Cincinnati, Ohio 45240

[21] Appl. No.: 268,823

[22] Filed: Jun. 1, 1981

[51] Int. Cl.$^3$ .............................................. B32B 7/02
[52] U.S. Cl. ..................... 428/195; 428/35; 428/516; 428/518; 428/520; 264/22; 427/12; 427/444; 426/127
[58] Field of Search ............... 428/516, 518, 520, 195, 428/35

[56] References Cited

U.S. PATENT DOCUMENTS

| 3,264,272 | 8/1966 | Rees | 428/910 |
| 3,775,239 | 11/1973 | Snow | 428/511 X |
| 3,998,990 | 12/1976 | Iwami et al. | 428/518 X |
| 4,096,946 | 6/1978 | Cook et al. | 428/518 |
| 4,161,562 | 7/1979 | Yoshikawa et al. | 428/518 |

FOREIGN PATENT DOCUMENTS 46-5059 of 1972 Japan .................................. 428/518

Primary Examiner—P. Ives

[57] ABSTRACT

The present invention relates to a food package and more particularly to an improved snack food package. The package comprises an outer layer of polypropylene, a polyvinylidene chloride middle layer and an inner ionomer resin layer. The invention also comprises an unique method for making the snack food package which includes a plurality of steps especially adapted to provide the required lamination between the layers.

4 Claims, 2 Drawing Figures

FOOD PACKAGE OF PLASTIC LAMINATE

BACKGROUND OF THE INVENTION

In recent years more foods have been packaged in flexible packaging materials. This is especially true in the area of snack foods, i.e, foods such as corn chips, potato chips, pretzels, and the like. This invention is especially directed to snack food packages, but it is also applicable to other types of flexible packages as well.

In the development of snack food packages those skilled in the art have recognized that the packages and the methods of making them must meet certain requirements. An especially important requirement of such packages, especially insofar as snack foods are concerned, is that the package should have good barrier properties, that is, it should be moisture proof and oxygen proof. This is required so that the contents are fresh and edible even when the package has remained on the shelf for an extended period of time. From the consumer standpoint, the package should be transparent so that the contents of the package may be easily viewed. The packaging material employed must be of a type which can be easily printed upon so that the printed matter is clearly and easily visible.

In addition to the functional requirements just mentioned, it has also been recognized that the cost of producing these packages is a very significant consideration. In the past functional characteristics have usually been sacrificed in order to achieve an economical method of production. Therefore there exists in the art a need for a snack food package which can be economically manufactured and which achieves the performance characteristics referred to above.

SUMMARY OF THE INVENTION

The snack food package of the present invention comprises an outer layer, not in contact with the food, of oriented, heat set, slip modified polypropylene. The polypropylene film is reverse printed in appropriate areas. Applied to the polypropylene film is a primer which enhances the bond between the polypropylene film and the middle layer of a polyvinylidene chloride polymer (hereinafter PVDC). An inner layer, i.e., adjacent to the food to be packed in the package, is made from an ionomer resin manufactured and sold by the E. I. DuPont Company under its trade name Surlyn. It has been empirically determined that an especially useful PVDC emulsion is made by the W. R. Grace & Company and sold under its trade name Daran 820. Through the use of this PVDC emulsion, a primer coat between the emulsion and the Surlyn ionomer resin is not required. Other types of PVDC emulsions are contemplated by the present invention but with them a primer between the PVDC and the Surlyn may be required. Preferably after the lamination of the three components has been obtained the Surlyn inside layer is treated with an encapsulated starch material called Oxy-Dry 955 obtained from Oxy-Dry, Inc. Such a product has a particle size of about 26 microns.

In attempting to provide the above described laminated food package product difficulties were encountered in attempting to manufacture the product. This is consistent with the general understanding in the art that PVDC emulsions and Surlyn ionomer resins do not bond together well enough to form a useful laminate. This problem as well as other problems encountered have been overcome through the inclusion of two corona discharge treatment steps. More particularly, prior to the time that the PVDC emulsion is coated onto the polypropylene film the polypropylene film is first subjected to a corona discharge treatment step. This is true even though during the manufacture of the polypropylene film it has been so treated. Subsequently after the PVDC has been coated onto the polypropylene film and the excess moisture has been dried, the PVDC surface is subjected to a corona discharge treatment step. This step significantly enhances the bond of the PVDC to the extruded Surlyn which is next applies to the laminate.

BRIEF DESCRIPTION OF THE DRAWINGS

Other advantages of this invention will become apparent from the detailed description of the invention taken with the accompanying drawings wherein.

DESCRIPTION OF THE PREFERRED EMBODIMENT

Figure 1:
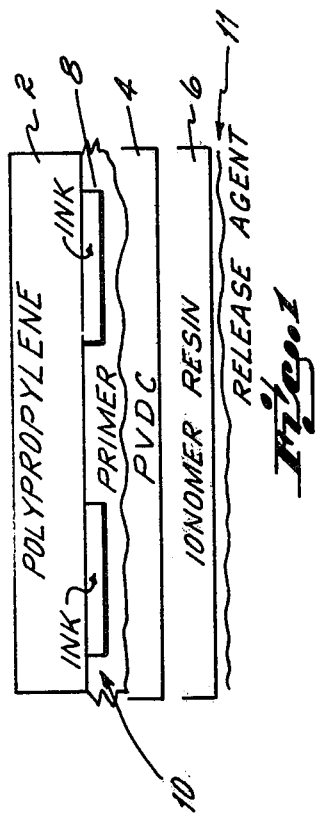
FIG. 1 is a cross-sectional view of the packaging material produced in accordance with this invention and FIG. 2 is a schematic diagram of suitable apparatus which may be utilized in the manufacture of the present snack food package.

Referring to FIG. 1 there is shown there a laminate which is especially useful as a snack food package. It includes three basic layers numbered 2, 4 and 6 which respectively comprise a polypropylene layer, a PVDC layer, and a Surlyn ionomer resin layer. The polypropylene layer is the exterior layer of the laminate while the Surlyn layer 6 is the interior layer of the package which is in direct contact with the contents of the package when it has been filled.

The polypropylene film 2 to be selected is preferably a 1 mil oriented, uncoated, heat set, two side treated (corona discharge) polypropylene. A suitable polypropylene is produced by the Mobile Chemical Company and sold under its trade name 306LCM and by the Hercules Company under its trade name 100T523. Other types of polypropylene films, some of which are coated, or even polyester films, could be utilized but because of cost considerations it has been found that the aforedescribed polypropylene films are preferred. The film is preferably about 1 mil thick. Table I sets forth additional properties of the Hercules B523 film which is a heat stabilized, balanced oriented polypropylene film that has both surfaces treated by a corona discharge treatment.

The PVDC layer 4 is preferably made from a PVDC-acrylate ester emulsion which is manufactured and sold by the W. R. Grace & Company under its trade name Daran X-820. As received the product contains about 50% by weight PVDC and other solids. Dilution with water on a 1 to 5 basis is preferred. The PVDC is coated onto the polypropylene by conventional means and preferably by applying about 2.75 pounds, dry weight, of PVDC per ream of polypropylene. This provides a moisture vapor transmission rate of 0.1 to 0.2 grams/100 in.$^2$/24 hrs. If desired, an increased amount of PVDC, i.e., 4 to 5 pounds per ream could be employed. Table II lists various properties of the emulsion and the film formed therefrom. It has been empirically determined that this material forms a layer to which the Surlyn ionomer resin layer 6 adheres to without the need to include a primer coating. Other PVDC emulsions may be utilized, but a primer coating between the PVDC and the Surlyn ionomer resin may be required.

The third or inside layer of the snack food package is manufactured from Surlyn ionomer resin. Preferably 1652SR ionomer resin or a combination of 1652SR and 1652SB, a 50—50 mixture, is employed. Table III sets forth various properties of these products. It is believed that the products are made in accordance with U.S. Pat. No. 3,264,272. The material is extruded onto the treated PVDC in an amount of about 10 pounds per ream.

Again referring to FIG. 1, in most instances the polypropylene will be reverse printed as shown by FIG. 8. Most frequently a primer layer 10 will be included to improve the bond between the polypropylene and the PVDC in the clear non-ink areas of the film as well as to some extent between the ink area of the film and the PVDC. A suitable primer is manufactured by the Converters Company under its trade name V88631. About 0.4 to 0.7 pounds per ream is sufficient.

Preferably also the laminate shown in FIG. 1 includes a coating 11 of Oxy-Dry 955, an encapsulated starch having a particle size of about 26 microns.

Figure 2:
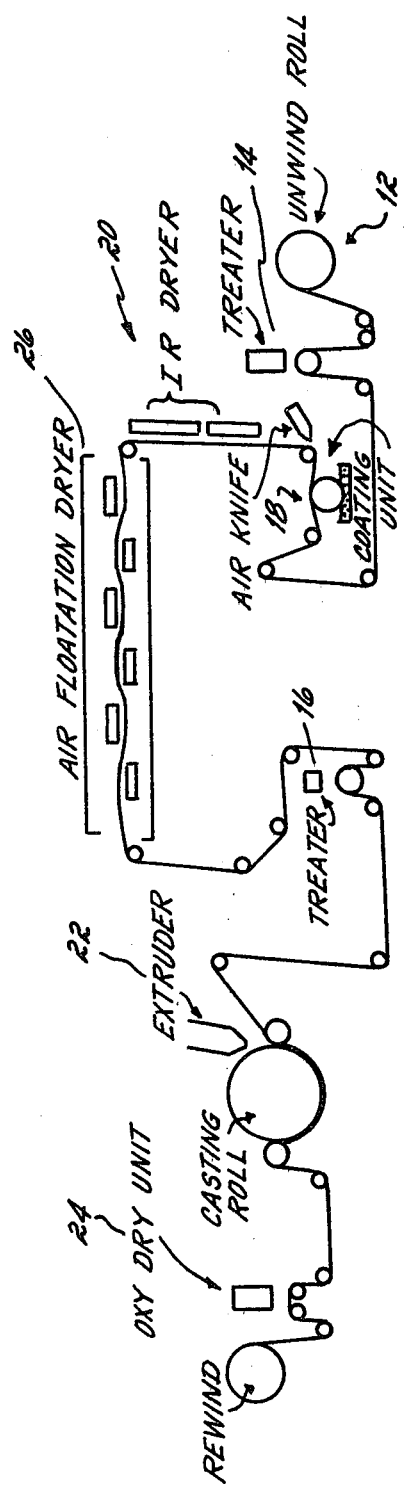

The following description taken in connection with FIG. 1 and FIG. 2 constitutes a description of the preferred embodiment of the present invention.

The one mil Hercules T523 polypropylene film as described in Table I was reverse printed on a conventional printing press. After the printing step a conventional primer was applied over the ink and clear area at the last printing station. The primer used was Converter Ink Company's V88631 and it was applied in an amount of about one-half pound per ream of polypropylene. The primer was applied so as to improve the bonds in the clear non-ink areas of the film. After this printing operation, the printed polypropylene was mounted onto roll 12.

Even though the polypropylene film had received a corona discharge treatment on both sides when it was manufactured, it should be treated again in order to improve both the wetting and the adhesion of the PVDC to be subsequently applied. Without this retreatment it has been found that the PVDC will wet the ink but not the film. A Pillar corona discharge unit 14 was employed. The amount of treatment was not found to be especially critical. The corona discharge treater was run at 85% volts and 40% amps (100% equals 355 volts; 100% equals 24 amps). The power was split evenly between the first treater 14 and a second treater 16. After the printed polypropylene film was subjected to the first corona discharge treatment it was conveyed by suitable means to a conventional air-knife coating unit 18. The Daran 820 PVDC emulsion was applied to the polypropylene film from a solid chrome roller and the excess coating was then metered off by an air-knife. The Daran 820 was diluted so that about 43% by weight solid PVDC was applied. This requires a dilution of a coating using a ratio of five gallons of Daran 820 to one gallon of tap water. Approximately 2.75 pounds, dry weight, per ream was applied. The wet film was then passed through infrared dryers 20, of conventional design, and through an air floatation oven of conventional design 26 where the excess moisture was dried from a film. The dried film then passed through a second corona discharge treater 16 for treatment of the PVDC layer. This additional treating step has been found to considerably enhance the bond between the PVDC and the Surlyn. For example, Table IV shows the difference in the lamination bond strength between a corona discharge treated and non-treated PVDC polypropylene composite.

Following the second corona discharge treatment step the laminate was conveyed by conventional means to a conventional extruder 22 where Surlyn 1652SR (10 pounds per ream) was extruded at normal extrusion temperatures (302° to 324° C.) onto the treated PVDC-polypropylene surface. Thereafter the laminate was conveyed through a conventional automatic controlled feeder device 24 where it received an application of Oxy-Dry 955.

The laminate snack food package just described had the physical properties set forth in Table V.

A snack food package may be manufactured from the hereinbefore described laminate by conventional means.

TABLE I

TYPICAL PROPERTIES OF HERCULES T523 POLYPROPYLENE

| | |
|---|---|
| Appearance | clear, transparent |
| Specific gravity, g/cm$^3$ | 0.905 |
| Tensile strength, psi (kg/cm$^2$), | |
| MD | 22,000 (1,550) |
| TD | 43,000 (3,020) |
| Elongation, %, | |
| MD | 150 |
| TD | 50 |
| Tensile modulus, psi (kg/cm$^2$), | |
| MD | 280,000 (19,700) |
| TD | 490,000 (34,400) |
| Elmendorf tear, g/mil | 4–6 |
| Flexibility | very high |
| Abrasion resistance | excellent |
| Low-temperature usefulness, °F. (°C.) | −76 (−60) |
| Water absorption, % | <0.005 |
| Coefficient of friction, film-to-film | 0.25 |
| MVTR,[a] g/100 in.$^2$ (g/m$^2$) | 0.3 (4.7) |
| Grease-and oil-resistance | very good |
| Acid-and alkali-resistance | excellent |

[a]1 mil at 100° F. (38°) for 24 hrs, 90% RH.

TABLE II

| EMULSION PROPERTIES OF DARAN X-820 | |
|---|---|
| Total Solids % | 49.0–51.0 |
| pH | 1.5–2.5 |
| Color | Cream White |
| Freezing Point | 36° F. |
| Particle Size, Microns (Avg.) | 0.10–0.14 |
| Weight per Gallon (Lbs.) | 10.4–10.5 |
| Specific Gravity | 1.252–1.265 |
| Viscosity cps. (Max.)[1] | 30 |
| FILM PROPERTIES OF DARAN X-820 | |
| Heat Sealability Range[2] | As low as 225° F. |
| WVTR[3] | Less than 0.2 |
| Oxygen Barrier[4] | 0.5 |
| Grease Barrier | Excellent |

[1]Brookfield LVF, #1 Spindle, 60 RPM at 77° F.
[2]20 psi at ½ sec. 30# opaque glassine
[3]Grams H$_2$O/0.5 mil/100 in.$^2$/24 hrs. at 90% RH and 100° F.
[4]cc. O$_2$/1 mil/100 in.$^2$/24 hrs. at standard conditions and 1 atmosphere pressure differential

TABLE III

GENERAL PROPERTIES OF "SURLYN" 1652 SR TYPE 30 EXTRUSION GRADE RESIN (ZN CATION)

| Property | Units | Method | Typical Value |
|---|---|---|---|
| Density | gm/cc | D-1505-68 | 0.939 |
| Melt Flow Index | decigm/min. | D-1238-65T | 4.4 |
| Mechanical (molded parts) | | | |
| Tensile Strength | psi | D-638-67 | 2850 |
| Yield Strength | psi | D-638-67 | 1870 |

TABLE III-continued

GENERAL PROPERTIES OF "SURLYN" 1652 SR TYPE 30 EXTRUSION GRADE RESIN (ZN CATION)

| Property | Units | Method | Typical Value |
| --- | --- | --- | --- |
| Elongation Film (2 mil, 2:1 blow up, 340° F. melt temp.) | % | D-638-67 | 580 |
| Dart Drop | gm/mil | D-1709-67 | 220 |
| Elmendorf Tear | gm/mil (MD/TD) | D-1922-67 | 125/148 |
| Stiffness (secant modulus) | psi (MD/TD) | D-882-67 | 27.8/27.8 |
| Yield Strength | psi (MD/TD) | D-882-67 | 1500/1670 |
| Break Strength | psi (MD/TD) | D-882-67 | 3230/3430 |
| Elongation | % (MD/TD) | D-882-67 | 400/495 |
| Haze | % | D-1003-61 | 5.2 |
| Gloss | Index at 20° F. | D-523-67 | 24 |
| Bag Drops | No. of drops at 9 feet | | 11 |
| Extrusion Coating (595° F. melt temp.) | | | |
| Adhesion to paper, Kraft | % fiber tear | peel test | 100% fiber tear at 1 mil 50% fiber tear at ½ mil |
| Adhesion to aluminum foil, | | | |
| Initial | gm/in | 90% peel | 600 min* |
| Aged | gm/in | 90% peel | 750 min* |
| Pinholes at ½ mil | no. sq. ft. | turpentine | 0 |
| MVTR | gm/100 sq. in/24 hr. | GF test | 1.8 |

*Without preheating or post heating. Greater than 1500 gm/in obtained with heat treatment.

TABLE IV

| LAMINATION BONDS (g/in) TO SURLYN | | |
| --- | --- | --- |
| | Ink/Primer | Clear/Primer |
| Corona Discharge Treated | 134 | 145 |
| Untreated | 32 | 48 |

TABLE V

| PROPERTIES OF SNACK FOOD PACKAGE | | |
| --- | --- | --- |
| PROPERTY | UNITS | VALUE |
| Yield* | In²/lb. | 16,228 |
| Gauge* | Mils | 1.95 |
| Heat Seal Range | °F. | 200-325 |
| Coefficient of Friction | Film/Film (Out—Out) | .4 |
| | (In—In) | .3 |
| WVTR | g/100 In²/24 Hrs | .1-.2 |
| O² | cc/100 In²124 Hrs | 1.0-2.0 |

*Theoretical Yield - Not Including Ink

Having thus described my invention, I claim:

1. A plastic laminate especially adapted for use as a food package, said laminate comprising in sequential layers from exterior to interior, a polypropylene layer, a polyvinylidene chloride polymer layer, and an ionomer resin layer as the inside layer of the package.

2. The laminate of claim 1 wherein the polypropylene and polyvinylidene chloride layer have been corona discharge treated.

3. The laminate of claim 2 wherein the polyvinylidene chloride layer is a polyvinylidene chloride-acrylate polymer and is applied in emulsion form.

4. The laminate of claim 3 wherein the polypropylene has been reverse printed.

* * * * *